US010774635B2

(12) United States Patent
Ruhle et al.

(10) Patent No.: US 10,774,635 B2
(45) Date of Patent: Sep. 15, 2020

(54) RESTIMULATION PROCESS USING COILED TUBING AND FIBER OPTICS

(71) Applicant: Halliburton Energy Services, Inc., Houston, TX (US)

(72) Inventors: William Owen Alexander Ruhle, Denver, CO (US); Geoffrey Gullickson, Denver, CO (US); Neha Sahdev, Denver, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 75 days.

(21) Appl. No.: 16/095,127

(22) PCT Filed: Jun. 10, 2016

(86) PCT No.: PCT/US2016/036984
§ 371 (c)(1),
(2) Date: Oct. 19, 2018

(87) PCT Pub. No.: WO2017/213670
PCT Pub. Date: Dec. 14, 2017

(65) Prior Publication Data
US 2019/0145250 A1    May 16, 2019

(51) Int. Cl.
*E21B 49/00*    (2006.01)
*E21B 43/26*    (2006.01)
(Continued)

(52) U.S. Cl.
CPC .............. *E21B 49/00* (2013.01); *E21B 43/26* (2013.01); *E21B 47/07* (2020.05); *E21B 47/107* (2020.05);
(Continued)

(58) Field of Classification Search
CPC .... E21B 47/07; E21B 47/02208; E21B 47/10; E21B 47/101; E21B 43/26; E21B 43/267;
(Continued)

(56) References Cited

U.S. PATENT DOCUMENTS

2009/0250211 A1    10/2009   Craig
2011/0088462 A1    4/2011    Samson et al.
(Continued)

FOREIGN PATENT DOCUMENTS

WO    2012/087306 A1    6/2012

OTHER PUBLICATIONS

International Search Report and Written Opinion issued in related PCT Application No. PCT/US2016/036984, dated Mar. 8, 2017, 15 pages.
(Continued)

*Primary Examiner* — Brad Harcourt
(74) *Attorney, Agent, or Firm* — Thomas Rooney; Baker Botts L.L.P.

(57) ABSTRACT

In accordance with presently disclosed embodiments, a method and system for performing real-time evaluation of a restimulation operation using coiled tubing with fiber optics is provided. The method involves performing a restimulation treatment by pumping a slurry with diverter materials through an annulus in the wellbore surrounding the coiled tubing, and using fiber optics in the coiled tubing to identify the order and magnitude of fractures being created during the restimulation treatment. The fiber optics in the coiled tubing may include one or more fiber optic cables designed to collect distributed acoustic sensing (DAS) or distributed temperature sensing (DTS) data. The evaluation of the restimulation operation may be used to validate and/or adjust the restimulation treatment as needed to improve the lateral distribution of transverse fractures through a subter-
(Continued)

ranean formation. The coiled tubing may also be used to remove sand bridges from the wellbore throughout the restimulation treatment.

20 Claims, 6 Drawing Sheets

(51) Int. Cl.
*G01P 5/24* (2006.01)
*G01N 29/04* (2006.01)
*G01N 29/24* (2006.01)
*E21B 47/07* (2012.01)
*E21B 47/11* (2012.01)
*E21B 47/107* (2012.01)
*E21B 47/135* (2012.01)

(52) U.S. Cl.
CPC ............ *E21B 47/11* (2020.05); *E21B 47/135* (2020.05); *G01N 29/04* (2013.01); *G01N 29/043* (2013.01); *G01N 29/2418* (2013.01); *G01P 5/241* (2013.01)

(58) Field of Classification Search
CPC ...... E21B 49/00; E21B 47/123; E21B 47/065; E21B 47/1015; G01N 29/04; G01N 29/043; G01N 29/2418; G01P 5/241
See application file for complete search history.

(56) References Cited

U.S. PATENT DOCUMENTS

| | | | |
|---|---|---|---|
| 2014/0358444 A1* | 12/2014 | Friehauf | E21B 47/065 |
| | | | 702/11 |
| 2015/0075292 A1 | 3/2015 | Lee | |
| 2015/0144347 A1 | 5/2015 | Brannon et al. | |
| 2016/0259088 A1* | 9/2016 | Carvajal | E21B 41/0092 |

OTHER PUBLICATIONS

Medina, Eber, et al. "Optimization of matrix acidizing with fluids diversion in real-time using distributed temperature sensing and coiled tubing." SPE/ICoTA Coiled Tubing & Well Intervention Conference & Exhibition. Society of Petroleum Engineers, 2015.
Webb, Earl Don, et al. "Real-time Fiber-optic Integrated System Used for Maximizing Coiled Tubing Wellbore Cleanouts in the Latin American Region." SPE Bergen One Day Seminar. Society of Petroleum Engineers, 2014.
Holley, Eric H., et al. "Interpreting uncemented multistage hydraulic-fracturing completion effectiveness by use of fiber-optic DTS injection data." SPE Drilling & Completion 28.03 (2013): 243-253.
Glasbergen, Gerard, et al. "Real-time fluid distribution determination in matrix treatments using DTS." European Formation Damage Conference. Society of Petroleum Engineers, 2007.

* cited by examiner

RESTIMULATION PROCESS USING COILED TUBING AND FIBER OPTICS

CROSS-REFERENCE TO RELATED APPLICATION

The present application is a U.S. National Stage Application of International Application No. PCT/US2016/036984 filed Jun. 10, 2016, which is incorporated herein by reference in its entirety for all purposes.

TECHNICAL FIELD

The present disclosure relates generally to restimulation operations, and more particularly, to a method and system using coiled tubing with fiber optics to improve fracture distribution during a restimulation operation.

BACKGROUND

Hydrocarbon-producing wells often are stimulated by hydraulic fracturing operations, wherein a servicing fluid such as a fracturing fluid or a perforating fluid may be introduced into a portion of a subterranean formation penetrated by a wellbore at a hydraulic pressure sufficient to create or enhance one or more fractures therein. Such a subterranean formation stimulation treatment may increase hydrocarbon production from the well.

Once hydrocarbon production has slowed from a particular fractured area, it is often desirable to find and exploit additional reserves of formation fluid. Restimulation operations in horizontal wells are becoming increasingly attractive as a method to add reserves and increase field production rates. Currently, restimulation operations can be performed by pumping self-degrading particles (diverters) into a wellbore to bridge off existing fractures. In some instances proppant can then be pumped down to induce new fractures across a large pay interval. Unfortunately, there can be a limited effectiveness of such diverters if too few or too many are pumped into the wellbore adjacent existing fractures. It is difficult to know the effect of the diverters added to a particular well until after the restimulation operation is complete.

Further, pumping diverters into horizontal wellbores can sometimes lead to the creation of sand dunes through the horizontal wellbore section. These sand dunes can bridge across the wellbore section, redirecting the flow of fluid in inefficient and unpredictable ways. The sand dunes often form in the middle of a restimulation operation, thereby affecting the remainder of the restimulation operation as well as later wellbore treatments.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
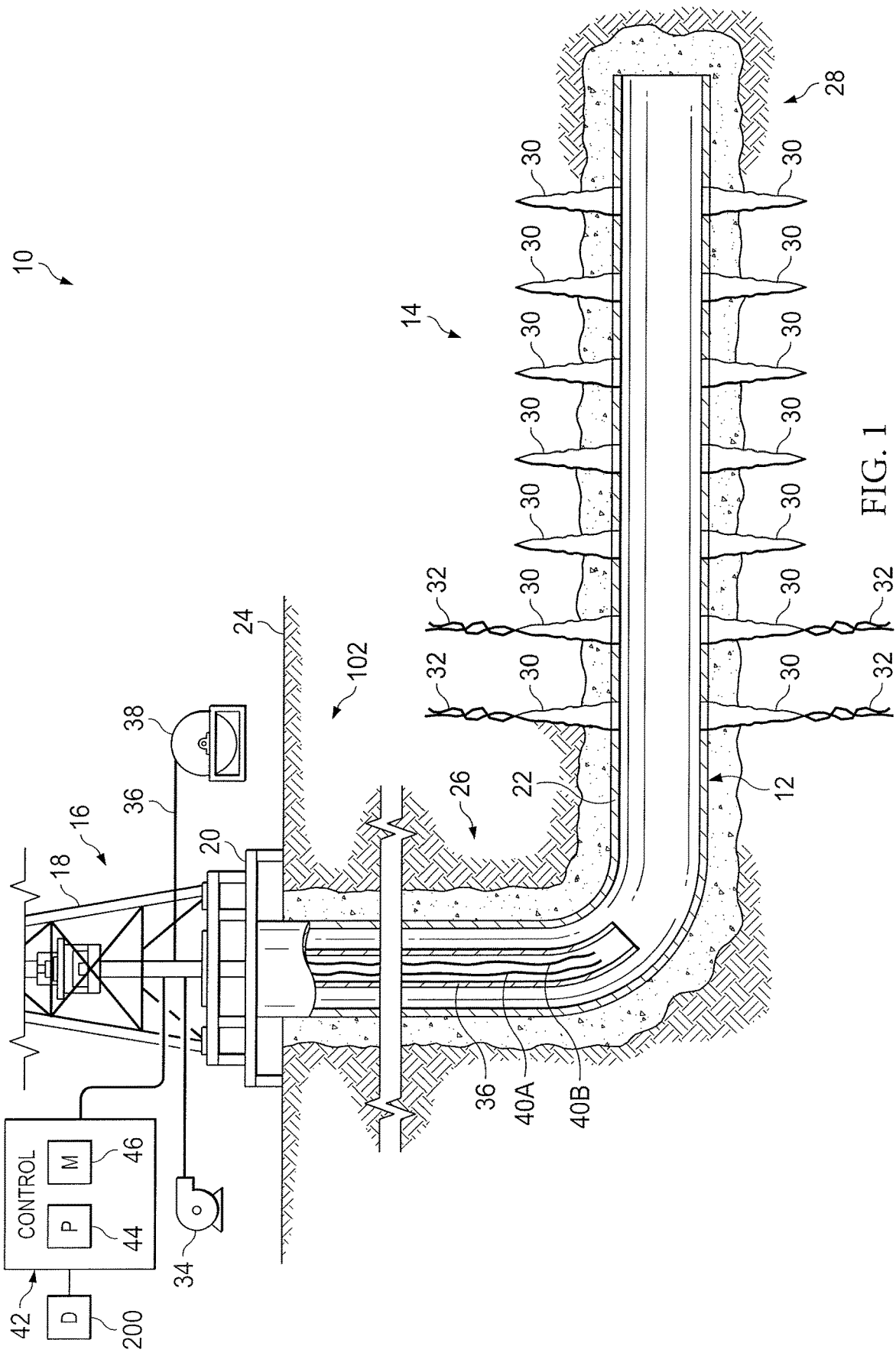
FIG. 1 is a partial cut-away view of a wellbore environment in which a restimulation treatment process may be employed, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for real-time evaluation of a restimulation operation using coiled tubing with fiber optics. The evaluation of the restimulation operation may be used to validate and/or adjust the restimulation treatment as needed to improve the lateral distribution of transverse fractures through a subterranean formation. The evaluation of the restimulation operation may also help in determining how the injectivity profiles along the lateral wellbore have been altered, and multiple injectivity profiles may be used to help understand the effectiveness of the diversion techniques applied.

Currently existing restimulation operations often utilize self-degrading particles to bridge off existing fractures. In some instances, the restimulation operations may include a refracturing operation of pumping down proppant to induce new fractures across a pay interval. However, other restimulation operations may be performed on the wellbore, such as introducing a treatment fluid downhole that does not include proppant or that is pumped at rates below fracture extension pressures.

The application of restimulation technology is limited by two factors. First, it is difficult to validate the effectiveness of each diverter application to ensure that fracture fluid is redirected to the desired new fractures. Second, the application of diverters to a horizontal wellbore during a restimulation operation can lead to the growth of sand dunes in the horizontal pipe, thereby preventing fluid from flowing to parts of the wellbore.

The disclosed systems and methods for performing real-time evaluations of a restimulation operation are designed to address and eliminate the shortcomings associated with existing processes. Specifically, the disclosed process is designed to remove sand bridges from the wellbore using coiled tubing lowered through the wellbore to a location proximate the perforations. The process also involves performing a restimulation treatment by pumping a slurry that includes diverter materials through an annulus in the wellbore surrounding the coiled tubing. The diverter materials may flow into and block existing fractures, allowing for the development of new fracture planes in the subterranean formation. The coiled tubing features fiber optics that may be used to identify the order and magnitude of fractures being created during the restimulation treatment. Such fiber optics may include one or more fiber optic cables designed to collect distributed acoustic sensing (DAS) data or distributed temperature sensing (DTS) data. Tracer fluid (e.g., having different rheological properties or temperatures than the contiguous fluid being injected) may be intermittently pumped downhole with the slurry to facilitate detection of the tracer fluid flow via the distributed sensing fiber optics in the coiled tubing. The collected distributed sensing data may be analyzed by a control system to monitor the annular slurry velocity and quantify leakoff points along the wellbore. The use of the coiled tubing with fiber optics to conduct cleanout and real-time fiber optic distributed sensing intermittently throughout a restimulation treatment may provide the ability to ensure the entire wellbore is effectively connected and/or validate that new fracture planes are being created during the restimulation operation.

Turning now to the drawings, FIG. 1 is an embodiment of an operating environment 10 in which the disclosed restimulation system and method may be employed. It should be noted that while the figures may exemplify horizontal or vertical wellbores, the principles of the methods and systems disclosed herein may be similarly applicable to horizontal wellbore configurations, conventional vertical wellbore configurations, and combinations thereof. Therefore, the horizontal or vertical nature of any figure is not to be construed as limiting the wellbore to any particular configuration.

As shown in FIG. 1, the operating environment 10 may generally include a wellbore 12 that penetrates a subterranean formation 14 having one or more formation zones for the purpose of recovering hydrocarbons. The wellbore 12 may be drilled into the subterranean formation 14 using any suitable drilling technique. In some embodiments, a drilling or servicing rig 16 may include a derrick 18 and a rig floor 20 through which a work string 22 (e.g., casing string) generally defining an axial flowbore may be positioned within or partially within the wellbore 12.

The wellbore 12 may extend substantially vertically away from the earth's surface 24 over a vertical wellbore portion 26, or may deviate at any angle from the earth's surface 24 over a deviated or horizontal wellbore portion 28. In other operating environments 10, portions or substantially all of the wellbore 12 may be vertical, deviated, horizontal, and/or curved and the wellbore 12 may be cased, uncased, or combinations thereof.

After the wellbore 12 has been drilled through the desired subterranean formations 14, formation entry points 30 may be formed to provide fluid communication between the wellbore 12 and the subterranean formation 14. For example, a perforating gun (not shown) may be lowered through the wellbore 12 and used to form perforations (entry points) 30 through the wellbore 12, casing 22, and cement to allow fluid communication between the wellbore 12 and the subterranean formation 14. In other embodiments, sliding sleeves (not shown) on a completion string (e.g., casing 22) may be opened to provide a similar formation entry point 30 for fluid communication between the wellbore 12 and the subterranean formation 14. During a fracturing operation following the creation of such entry points 30, one or more treatment fluids may be pumped at high pressure through the wellbore 12 to form fractures 32 in the subterranean formation 14 adjacent the entry points 30. Such fracturing operations may help to increase production of oil and gas from the subterranean formation 14. Other types of treatments may be performed as well to condition the subterranean formation 14 for increased production of formation fluids.

At times it may be desirable to perform a restimulation operation to find and exploit additional reserves of formation fluid after production has slowed from existing fractured sections of the subterranean formation 14. To that end, a high pressure pump 34 may be connected to the wellbore 12 and used to pump a restimulation slurry through the wellbore 12. The restimulation slurry may include a diverter material that is mixed with fluid, and the diverter material may be directed into existing fractures 32 to close or temporarily block those fractures 32. In some embodiments, fracturing fluid may then be directed into other entry points 30 along the wellbore 12 to form additional fracture planes within the subterranean formation 14. These new fracture planes may help to increase the production of hydrocarbons from the subterranean formation 14 following the restimulation operation.

During the restimulation operation, it is desirable to monitor the progress of the restimulation in real-time or near real-time. That way, an operator or automated system may be able to make adjustments to the slurry mixture to improve the formation and distribution of transverse fracture planes within the subterranean formation 14. To that end, the disclosed system may utilize a coiled tubing member 36 disposed within the wellbore 12.

The coiled tubing member 36 may be selectively unspooled from and/or spooled onto a reel 38 disposed at the surface 24 to adjust a position of the coiled tubing 36 within the wellbore 12. For example, unspooling the coiled tubing member 36 from the reel 38 may lower the coiled tubing 36 to a lower position extended through the wellbore 12, while spooling the coiled tubing 36 back onto the reel 38 may raise the coiled tubing 36 through the wellbore 12. The approximate depth of the coiled tubing member 36 extending into the wellbore may be adjusted at different points during the restimulation operation, as described below.

The coiled tubing member 36 includes at least one optical waveguide 40, such as a fiber optic cable, extending therethrough. The optical waveguide(s) 40 may use an optical fiber as a distributed sensor to measure various properties of the wellbore during the restimulation operation. For example, a first optical waveguide 40A may act as a distributed acoustic sensor to measure the properties of acoustic waves that strain the waveguide 40A. This sensing may be performed by interrogating the backscattered light returning from the waveguide 40A. Changes in the backscattered light can indicate the presence and also certain characteristics of acoustic waves at different positions along the wellbore 12. Accordingly, the optical waveguide 40A may be used to detect distributed acoustic sensing (DAS) data.

In addition, a second optical waveguide 40B in the coiled tubing member 36 may act as a distributed temperature sensor to measure thermal properties that strain the waveguide 40B. This sensing may be performed by interrogating the backscattered light returning from the waveguide 40B. Changes in the backscattered light can indicate variation in the temperature of fluids at different positions along the length of the wellbore 12. Accordingly, the optical waveguide 40B may be used to detect distributed temperature sensing (DTS) data.

Although the illustrated coiled tubing 36 features one DAS data sensing optical waveguide 40A and one DTS data sensing optical waveguide 40B, it should be noted that other embodiments may have different arrangements of fiber optic distributed sensors in the coiled tubing 36. For example, the coiled tubing 36 could include just a single DAS data sensing optical waveguide 40A, just a single DTS data sensing optical waveguide 40B, multiple sets of one or the other type of optical waveguide 40, or multiple sets of both types of optical waveguides 40. It should be noted that optical waveguides may also be used for real-time data transfer to/from one or more tools (e.g., a point pressure gauge) on the coiled tubing bottom hole assembly.

A control system 42 disposed at the surface 24 may be communicatively coupled to the one or more optical waveguides 40 positioned in the coiled tubing member 36. The control system 42 utilizes at least a processor component 44 and a memory component 46 to monitor and/or control the restimulation operation. For example, one or more processor components 44 may be designed to execute instructions encoded into the one or more memory components 46. Upon executing these instructions, the processors 44 may determine and log changes in the fracture planes formed in the subterranean formation based on the detected DAS and/or DTS signals retrieved during the restimulation operation. In some embodiments, the one or more processors 44 may execute instructions for controlling operations of certain well site components (e.g., pump 34, or a slurry mixing component). This may help to control the pumping pressure or the concentration of diverter particulate in the slurry mixture being pumped downhole to improve the efficiency and/or effectiveness of the restimulation operation.

Figure 2:
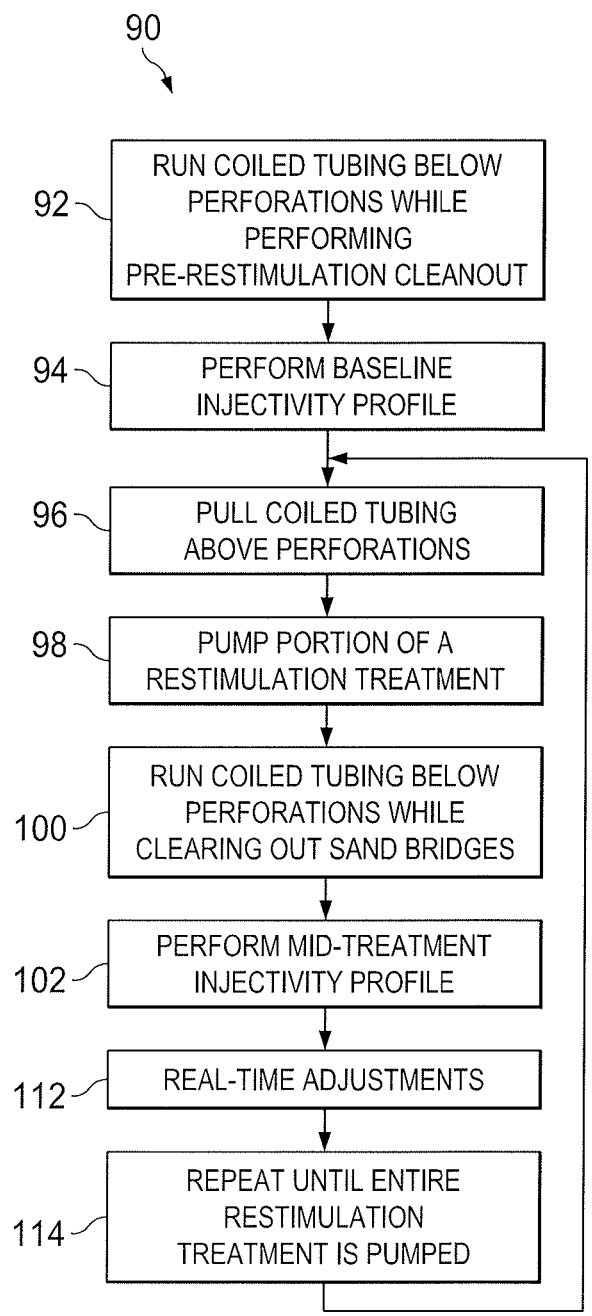
FIG. 2 is a process flow diagram of a method for using coiled tubing with fiber optic components during a restimulation process, in accordance with an embodiment of the present disclosure.

FIG. 2 is a process flow diagram of a method 90 for operating the above described system to improve the effectiveness of a restimulation operation. The method 90 includes running (block 92) the coiled tubing through the wellbore to a position where the bottom of the coiled tubing is below the entire set of perforations. The coiled tubing 36 is shown in this lowered position in FIG. 3. In a horizontal wellbore 12, lowering the coiled tubing 36 to this position effectively cleans out the horizontal section of the wellbore 12 (e.g., adjacent the entry points 30). The coiled tubing 36 may move through and circulate any sand dunes formed from diverter or other particulate that had previously settled in the horizontal wellbore. That way, the coiled tubing 36 is run in while performing a pre-restimulation cleanout of the wellbore 12. This may ultimately allow the restimulation operation to proceed without sand deposits impeding the fluid movement through the wellbore 12.

Once the coiled tubing has been lowered below the perforations to clean out the wellbore 12, the method 90 of FIG. 2 may include performing a baseline injectivity profile (block 94) of the wellbore section adjacent the entry points 30. The baseline injectivity profile (block 94) may be a temperature survey, an acoustic survey, or both, of the wellbore section. This may be accomplished by taking one or more samples of DTS/DAS data via one or more sensing fiber optic cables (e.g., 40 of FIG. 3). The control system (e.g., 42 of FIG. 3) may process and/or store the DAS/DTS data to determine the locations of initially existing near-wellbore fracture initiation points. The method 90 may then include pulling (block 96) the coiled tubing to a position where the lower end of the coiled tubing is above the highest perforation (at minimum). FIG. 1 shows the coiled tubing raised to such a position. This may prevent sand dunes from forming around the coiled tubing during a fracture treatment, so that the coiled tubing does not become stuck in the horizontal wellbore.

The method 90 may include pumping a portion of a restimulation treatment (block 98) through the wellbore and out into the perforations and/or fractures in the formation while the coiled tubing is in the raised position. The restimulation treatment (block 98) may be a desired slurry of wellbore treatment fluid mixed at the surface. Depending on the design of the slurry rate and casing diameter in the wellbore, the main restimulation treatment (block 98) may be pumped down the annulus of the coiled tubing positioned in the wellbore (e.g., coiled tubing 36 in the wellbore 12 as shown in FIG. 1). In other embodiments, the coiled tubing may be pulled entirely to the surface of the wellbore to enable pumping of the restimulation treatment (block 98) at the desired slurry rate. Pumping of the restimulation treatment (block 98) may continue until an intermittent break in the treatment.

Figure 3:
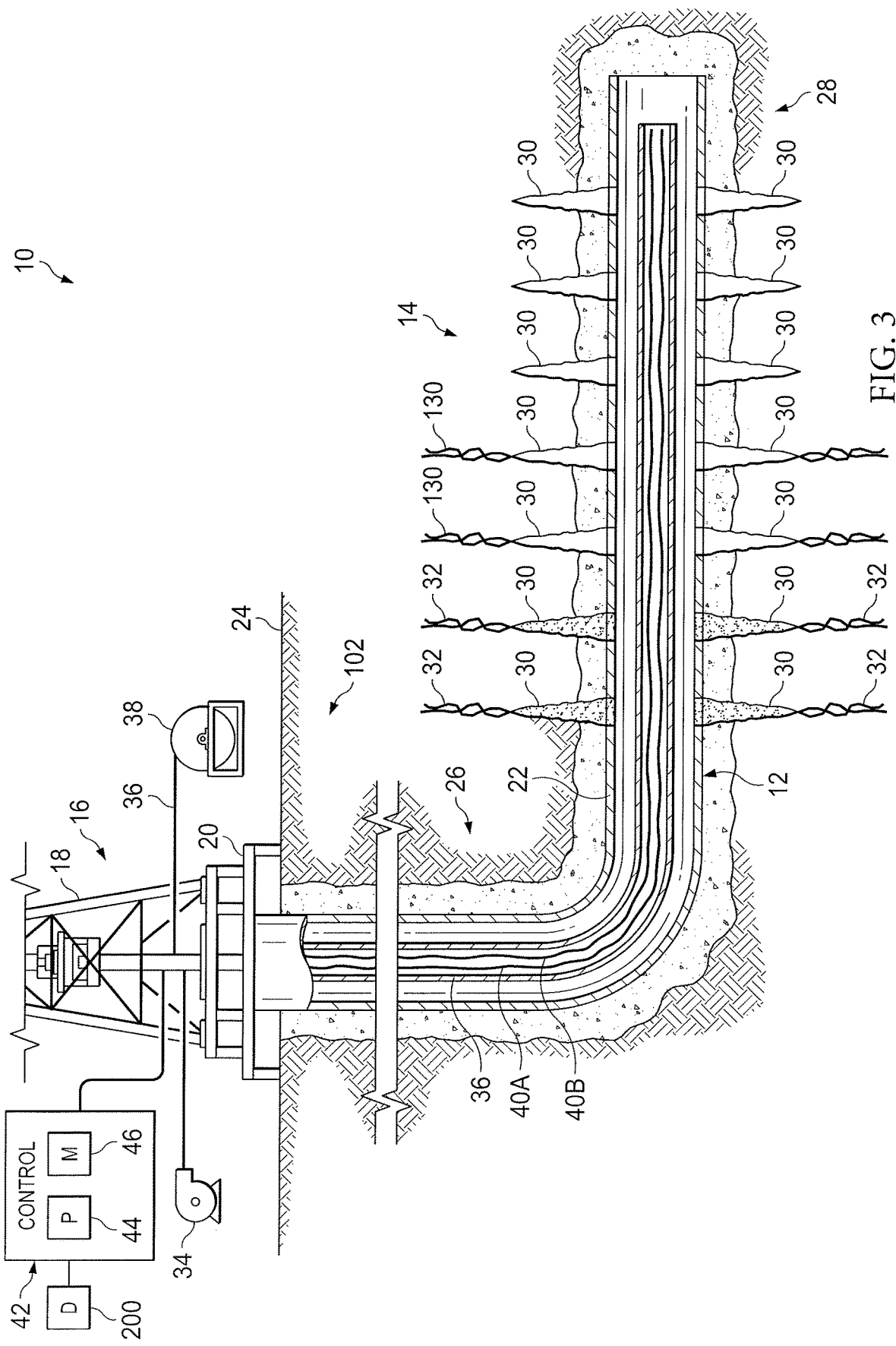
FIG. 3 is a partial cut-away view of the wellbore environment of FIG. 1 with a coiled tubing member lowered to a position proximate perforations in the wellbore, in accordance with an embodiment of the present disclosure.

At the break in the restimulation treatment, the coiled tubing may be run in hole (block 100) to the position below the perforations (as shown in FIG. 3), circulating any residual sand in the horizontal wellbore to the surface. In this manner, the coiled tubing may function to clean out the horizontal wellbore mid-treatment, removing or clearing any particulate bridges and sand dunes that had previously formed across the wellbore. Once the coiled tubing is at the total depths of the perforations, the method 90 may include performing a mid-treatment injectivity profile (block 102) on the wellbore. The mid-treatment injectivity profile 102 may be based on temperature data, acoustic data, or both.

Figure 6:
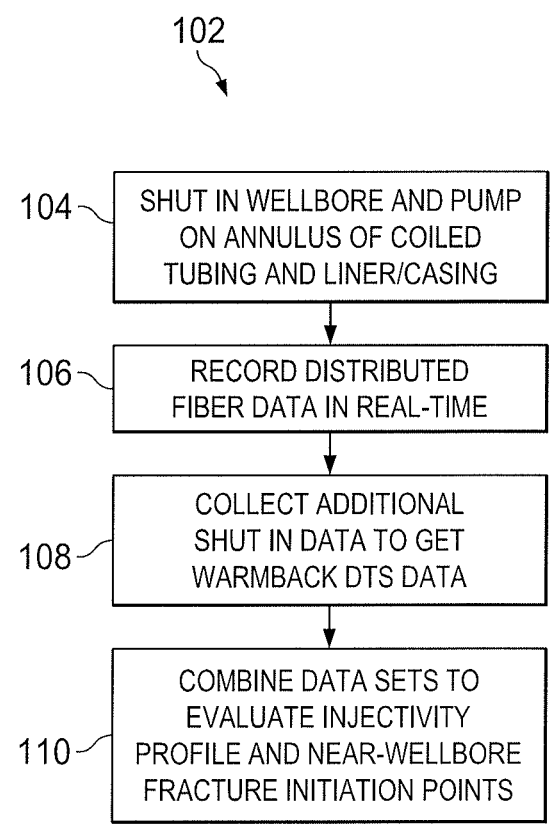
FIG. 6 is a process flow diagram of a method for performing an injectivity profile during a restimulation process, in accordance with an embodiment of the present disclosure.

FIG. 6 is a process flow diagram illustrating a method for performing the injectivity profile 102. The method 102 may include shutting in the wellbore and pumping (block 104) a slurry including diverter material (e.g., Biovert®) down an annulus of the wellbore surrounding the coiled tubing and liner or casing. This diverter material being pumped downhole may bridge off the existing fracture planes and create new fracture planes. For example, as shown in FIG. 3, the diverter material in the slurry may be pumped downhole to bridge off the old fractures 32 and create new fractures 130 at different perforations along the wellbore 12.

While performing this pumping (block 104) of slurry with diverter material, the method 102 includes collecting or recording distributed sensing data (block 106) in real-time. The distributed sensing data (block 106) may be collected across the entire perforated section of the wellbore using the distributed sensing optical fiber(s) in the coiled tubing. This may involve collecting DAS/DTS data via one or more optical cables (40) in the coiled tubing. In some embodiments, a tracer fluid may be pumped downhole sequentially with the slurries of diverter material. As the tracer fluid is pumped down the annulus surrounding the coiled tubing, real-time fiber optic distributed sensing data may be collected. For example, a fiber optic cable may detect a frequency, or thermal response based on the location of the tracer fluid within the wellbore.

In some embodiments, the method 102 may optionally include collecting additional shut in data (block 108) after the pumping has stopped to obtain warmback DTS data. The method 102 further includes combining (block 110) the collected data sets to evaluate the injectivity profile and near-wellbore fracture initiation points. The control system may evaluate (block 110) the collected DAS/DTS data to determine the location of near-wellbore fracture initiation points along with an injectivity profile along the entire length of the wellbore section. This data can then be compared to the information obtained during the initial baseline injectivity profile (block 94 of FIG. 2) to evaluate the progress of the restimulation treatment (e.g., to ensure that new fracture planes are being created).

By pumping such customized slurries of diverter material with the coiled tubing deployed downhole below the perforations, new fracture planes may be created and validated in real-time by monitoring the flow of fluids via distributed sensing fiber optics. Such analysis can be performed at different times throughout the restimulation treatment, as well as before beginning the fracture treatment (e.g., block 94) or after completing the restimulation treatment.

Turning back to FIG. 2, based on the evaluation of the latest injectivity profile (block 102), the control system may determine (block 112) an adjustment to the amount of diverter material being pumped downhole or where to insert the diverter material in the treatment. For example, if a large amount of leakoff is detected in an unproductive area of the wellbore, it may be desirable to add more diverter material to the slurry to divert from that area of the wellbore. In other embodiments, the monitored leakoff data may indicate that there is too much diverter material being added to the perforated wellbore and that the diverter material needs to dissolve for some time before pumping additional slurry downhole.

Once the injectivity profile (block 102) and/or real-time adjustments (block 112) are completed, the process may be repeated (block 114) until the entire restimulation treatment has been pumped. The coiled tubing may again be pulled back out of hole (block 96) to a position above the perforations, and the sequence of blocks 96 to 112 may be repeated until the restimulation treatment is completed. Although this process may take additional time to complete compared to existing restimulation operations, a limited number of intermittent cleanouts (block 100) and injectivity profiles (blocks 102) performed during the treatment may provide an important assessment of the effectiveness of the diversion. Additionally, the method 90 allows operators to make informed changes to the slurry treatment being pumped downhole in real-time during the treatment, instead of just evaluating the end results of the treatment.

As mentioned above with respect to block 106 of FIG. 6, the injectivity profile method 102 involves collecting and utilizing distributed sensing via fiber optics to perform surveys of the wellbore during a restimulation treatment. This could include, for instance, distributed temperature sensing (DTS) and distributed acoustic sensing (DAS) via fiber optic cables. The DAS and/or DTS data collected using this technology may be interpreted to quantify the leakoff points along the wellbore during the restimulation treatment. The DAS and/or DTS data may show precisely where the fluid exits the wellbore into the subterranean formation. The control system may map out these leakoff points on a display (e.g., part of an operator interface coupled to the control system). The resulting leakoff data, along with the injectivity profile, may be used to validate or update the required volumes, pressures, and concentrations of diverter slurry needed to effectively divert in a given formation.

Figure 4:
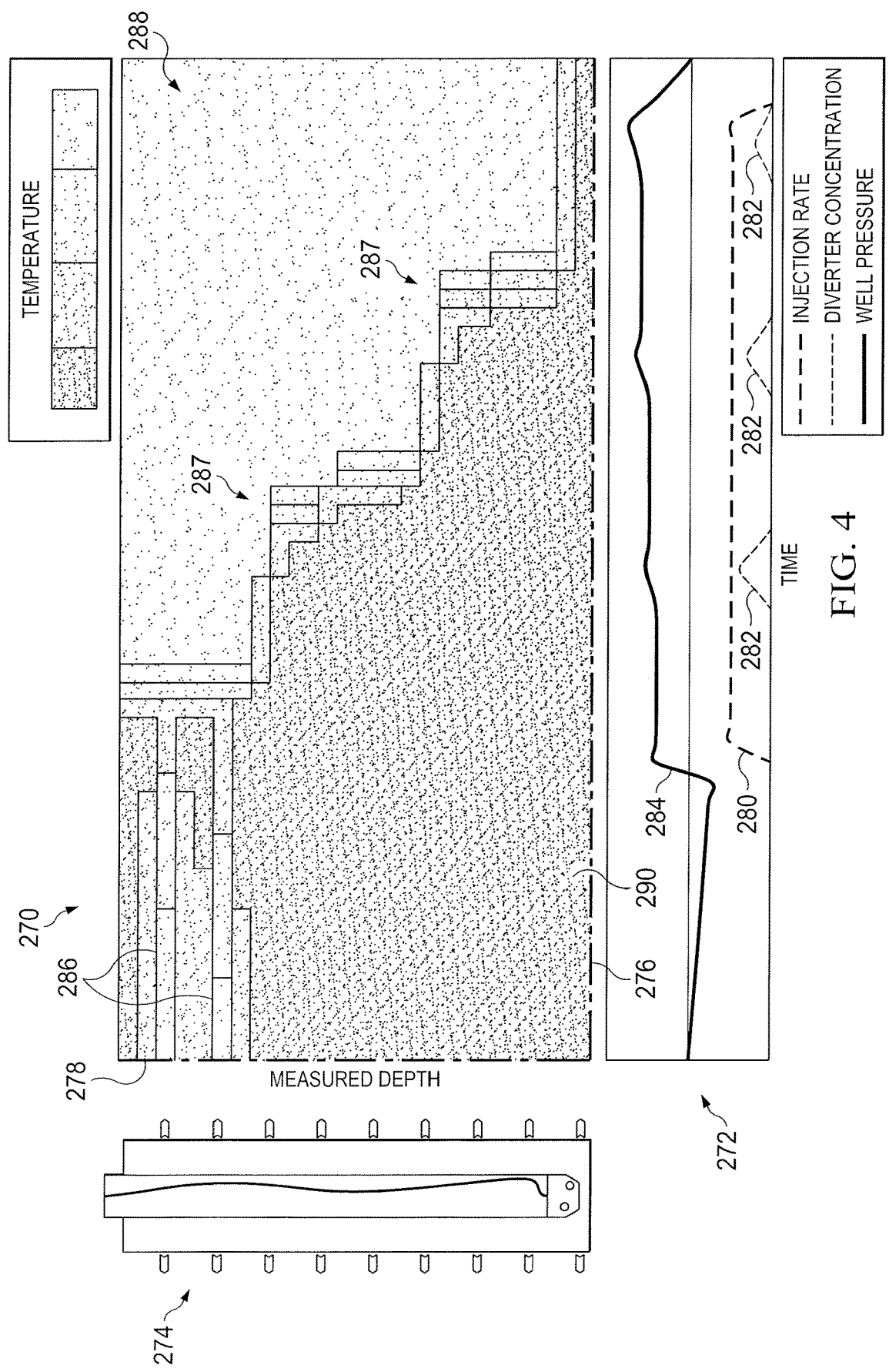
FIG. 4 is a diagram illustrating real-time distributed temperature sensing (DTS) data being used to evaluate fracture planes in a wellbore, in accordance with an embodiment of the present disclosure.

FIG. 4 illustrates how DTS data captured in real-time via a fiber optic cable in the coiled tubing may be used to monitor the restimulation operation. In some embodiments, the DTS information may be displayed in the illustrated format to an operator via a display 200 coupled to the control system of FIG. 1, for example. The DTS data may be provided by a fiber optic cable 40B in the coiled tubing 36 designed to detect variations in a temperature wave (instead of a velocity) along the perforated section of the wellbore 12. Such differences in temperature may be a result of thermal tracer fluid that is intermittently pumped downhole during the restimulation operation, as described above with reference to FIG. 2. In other instances, the temperature differences may simply be a result of where the restimulation fluid is moving through the perforated section of the wellbore, without the addition of thermal tracer fluid.

The illustrated embodiment shows a temperature map 270 (e.g., temperature injectivity profile) of DTS data detected by the fiber optic cable 40B, a pumping chart 272 indicative of the restimulation operation being performed during the DTS data collection, and a wellbore display 274 showing the approximate location of the perforations (or other entry points) 30 along the length of the wellbore 12 adjacent the coiled tubing 36. The temperature map 270 is plotted with respect to time on the x-axis 276 and is sequenced with the pumping chart 272 with respect to time. The temperature map 270 is plotted with respect to wellbore depth on the y-axis 278 and is sequenced with the wellbore display 274 with respect to depth. The "depth" may refer to the distance along the axial flowbore of the perforated section of the wellbore 12, regardless of whether that section of the wellbore is vertically oriented or horizontally oriented. The pumping chart 272 may track an injection rate 280 of the slurry being pumped downhole during DTS data collection, the concentration of diverter material 282 being pumped downhole in the slurry, and a well pressure 284 throughout the pumping operation.

As tracked by the temperature map 270, the pumping chart 272, and the wellbore display 274, the data shown in FIG. 1 illustrates the following process. First, the horizontal wellbore 12 is cleaned out to a total depth via the coiled tubing 36 being lowered through the perforated section of the wellbore 12. This may be performed prior to collection of DTS data via the fiber optic cable 40B. As illustrated in the wellbore display 274, the coiled tubing 36 may be positioned below the deepest perforation 30. DTS data collection is then started, without pumping any slurry downhole. As described above with reference to FIG. 2, this is a warmback procedure performed to determine a current state of the fracture planes prior to beginning the slurry treatment. In the illustrated embodiment, the temperature map 270 identifies two fractures 286 located at the upper two perforations 30 of the wellbore 12 using the warmback analysis.

Once these fracture planes are known, the slurry having the diverter material may be pumped into the annulus of the wellbore 12 surrounding the coiled tubing 36. As time goes on, the temperature map 270 changes based on the collected DTS data to illustrate changes in the fracture planes 287 of the formation. The temperature contrast between the cool fluids injected into the well 288 and the warm stagnate fluids 290 not moving within the well verify that the diverter material 282 being added has forced treatment fluid to flow further along the wellbore, where fluid had been previously stagnate.

The process of pumping a slurry with the diverter material while performing real-time fiber optic analysis may be repeated until the desired resulting fracture planes are created. As mentioned above, based on feedback from the collected DTS data indicative of the location of new fracture planes, adjustments may be made to the restimulation treatment as needed to reach the desired configuration of fractures in the wellbore.

Figure 5:
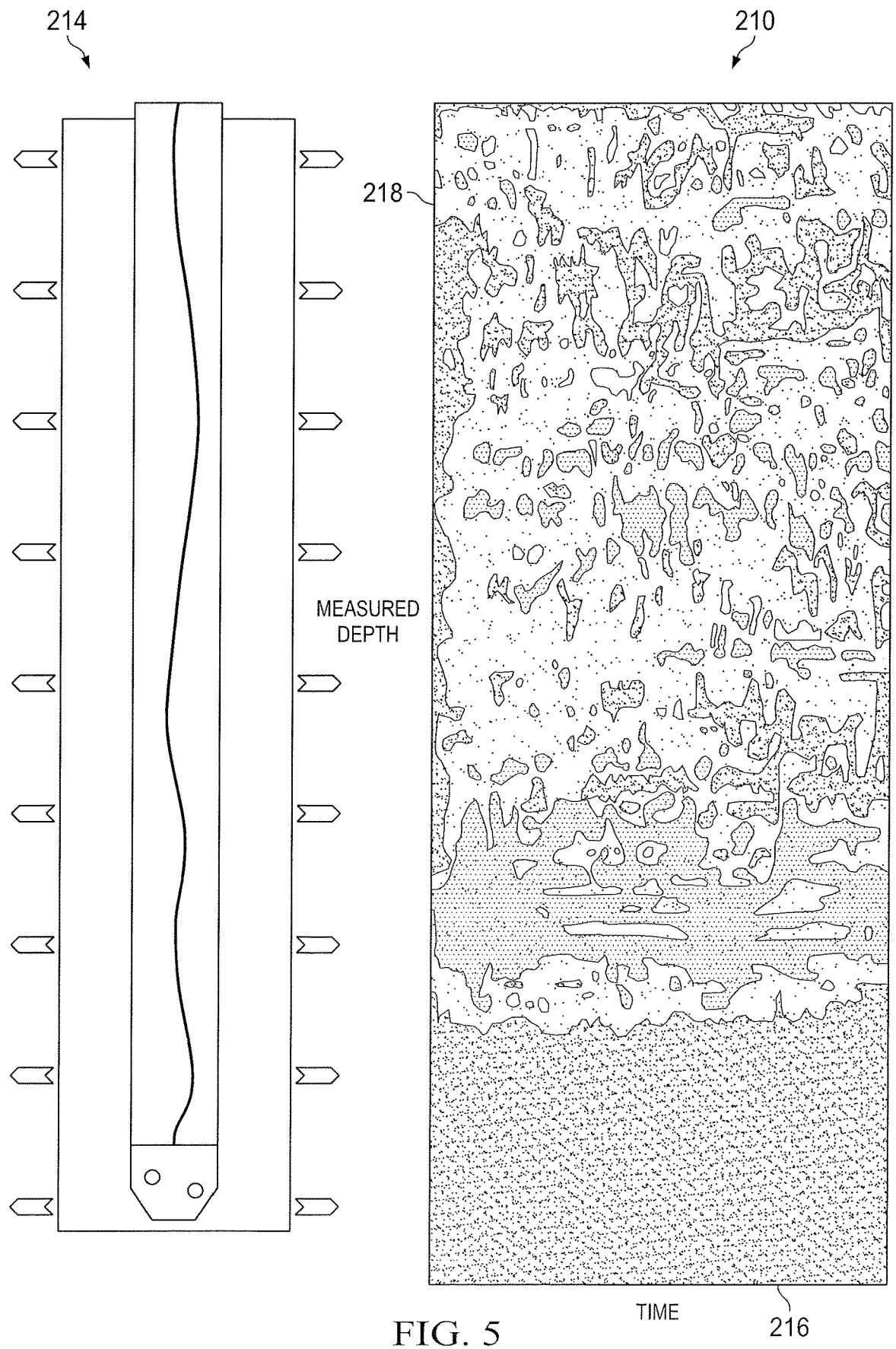
FIG. 5 is a diagram illustrating real-time distributed acoustic sensing (DAS) data being used to evaluate fracture planes in a wellbore, in accordance with an embodiment of the present disclosure.

FIG. 5 illustrates how DAS data captured in real-time via a fiber optic cable 40A in the coiled tubing 36 may be used to monitor the restimulation operation. In some embodiments, the DAS information may be displayed in the illustrated format to an operator via a display 200 coupled to the control system of FIG. 1, for example. The DAS data may be provided by a fiber optic cable 40A in the coiled tubing 36 designed to detect variations in a velocity of treatment fluid along the perforated section of the wellbore 12. The velocity may be used to determine a quantity and direction of fluid moving through the wellbore and out into the formation.

The velocity may be determined based on the difference in the volume of fluid being pumped downhole and the distributed acoustics detected via the fiber optic cable 40A. In some embodiments, the velocity may be determined based on detection of a tracer fluid that is intermittently pumped downhole during the restimulation operation, as described above with reference to FIG. 2. The tracer fluid may have different rheological properties than the contiguous fluid being injected such that variations in the DAS signal may be detected to determine the location of the tracer fluid. This is because fluids with different rheological properties (or having different amounts or types of particulates disposed therein) may produce a different noise profile in the DAS data.

The illustrated embodiment shows a map 210 of DAS data detected by the fiber optic cable 40A and a wellbore display 214 showing the approximate location of the perforations (or other entry points) 30 along the length of the wellbore 12 adjacent the coiled tubing 36. The acoustic map 210 (e.g., acoustic injectivity profile) is plotted with respect to time on the x-axis 216. Although FIG. 5 does not show a pumping chart, in other displays the acoustic map 210 may be sequenced with a pumping chart with respect to time (similar to FIG. 4 above). The acoustic map 210 is plotted with respect to wellbore depth on the y-axis 218 and is sequenced with the wellbore display 214 with respect to depth. The "depth" may refer to the distance along the axial flowbore of the perforated section of the wellbore 12, regardless of whether that section of the wellbore is vertically oriented or horizontally oriented.

As tracked by the acoustic map 210 and the wellbore display 214, the data shown in FIG. 1 illustrates the following process. First, the horizontal wellbore 12 is cleaned out to a total depth via the coiled tubing 36 being lowered through the perforated section of the wellbore 12. This may be performed prior to collection of DAS data via the fiber optic cable 40A. As illustrated in the wellbore display 214, the coiled tubing 36 may be positioned below the deepest perforation 30.

DAS data collection is then started, without pumping any slurry downhole. Since the DAS is an acoustic measure, the baseline or starting point of the DAS collection would generally yield background noise present in the signal. In some embodiments, a tracer fluid may be pumped downhole such that the DAS data collected can be used to determine a current state of fracture planes prior to beginning the slurry treatment.

Once the initial fracture planes are known, the slurry having the diverter material may be pumped into the annulus of the wellbore 12 surrounding the coiled tubing 36. As time goes on, the acoustic map 210 may change based on the collected DAS data to illustrate changes in the fracture planes of the formation. The differential phase information combined with detected rheological properties of different fluids pumped may provide insight into the distribution of the fluid. The velocity of fluids within the well may verify that the diverter material being added has forced treatment fluid to flow further along the wellbore, where fluid had been previously stagnate.

The process of pumping a slurry with the diverter material while performing real-time fiber optic analysis may be repeated until the desired resulting fracture planes are created. As mentioned above, based on feedback from the collected DAS data indicative of the location of new fracture planes, adjustments may be made to the restimulation treatment as needed to reach the desired configuration of fractures in the wellbore.

The disclosed techniques described above with reference to FIGS. 1-5 utilize coiled tubing 36 with one or more fiber optic cables 40 for two purposes during a restimulation operation. First, the coiled tubing 36 is used to remove particulates (e.g., sand dunes) from the wellbore 12 during a restimulation treatment. Second, the coiled tubing provides fiber optic distributed sensing to collect DAS and/or DTS data, which is then analyzed to quantify leakoff points and evaluate the redirection of fluid via diverter materials during the restimulation treatment.

The disclosed techniques overcome limiting factors in current restimulation technology using particulate diverters. Specifically, the disclosed techniques enable the removal of sand dunes formed in horizontal pipe during a restimulation treatment as well as the evaluation of diverter material performance in real-time using fiber optic distributed sensing. As a result, the disclosed systems and methods facilitate smarter and more effective stimulation of horizontal wellbores using particulate diverters. The process described above may require additional time and services compared to traditional restimulation operations. However, the enhanced application of diverters will ultimately increase the productivity of the restimulation treatment, thereby reducing the cost per unit production in restimulated horizontal wells.

Embodiments disclosed herein include:

A. A method including positioning coiled tubing in a wellbore proximate a plurality of entry points formed between the wellbore and a subterranean formation. The method also includes pumping a slurry including diverter material into an annulus of the wellbore surrounding the coiled tubing. The method further includes collecting distributed acoustic sensing (DAS) data along a fiber optic cable disposed in the coiled tubing while pumping the slurry, and analyzing the DAS data to evaluate changes in fracture planes in the subterranean formation due to interaction of the diverter material with the plurality of entry points.

B. A system including a coiled tubing member including a distributed acoustic sensing (DAS) fiber optic cable for collecting DAS data along a length of the coiled tubing member. The system also includes a processing component communicatively coupled to the DAS fiber optic cable. The system further includes a memory component containing a set of instructions that, when executed by the processing component, cause the processing component to: receive DAS data collected by the DAS fiber optic cable when the coiled tubing member is disposed in a wellbore and a slurry containing diverter material is being pumped through the wellbore and into a subterranean formation via entry points, and determine a change in fracture planes in the subterranean formation based on the collected DAS data.

Each of the embodiments A and B may have one or more of the following additional elements in combination: Element 1: further including removing residual particulates from the wellbore proximate the plurality of entry points via the coiled tubing. Element 2: further including raising the coiled tubing to a location above the plurality of entry points prior to pumping a treatment fluid into the wellbore. Element 3: further including lowering the coiled tubing from the location above the plurality of entry points to a position proximate the plurality of entry points to collect DAS data multiple times during breaks in pumping the treatment fluid. Element 4: further including pumping the treatment fluid into the wellbore when the coiled tubing is disposed at least partially in the wellbore. Element 5: further including pumping the treatment fluid into the wellbore when the coiled tubing is entirely removed to a surface of the wellbore. Element 6: further including collecting distributed temperature sensing (DTS) data along a second fiber optic cable disposed in the coiled tubing while pumping the slurry; and analyzing the DTS data with the DAS data to evaluate changes in fracture planes in the subterranean formation. Element 7: further including pumping a thermal tracer into the wellbore with the slurry and collecting the DTS data to detect a flow of the thermal tracer. Element 8: further including shutting in the wellbore and performing a baseline DAS data survey of the wellbore proximate the plurality of entry points via the fiber optic cable prior to pumping the slurry. Element 9: further including blocking one or more entry points of the plurality of entry points via the diverter material in the slurry, and redirecting fluids from the wellbore into different entry points. Element 10: further including collecting the DAS data along a length of the wellbore spanning all of the plurality of entry points. Element 11: wherein analyzing the DAS data includes determining a velocity of fluid moving through the annulus based on the DAS data and determining a quantity and direction of fluid moving through the annulus based on the velocity. Element 12: further including pumping a tracer fluid with the slurry and collecting the DAS data to detect a flow of the tracer fluid. Element 13: further including displaying an injectivity profile indicative of the changes in fracture planes in the subterranean formation. Element 14: further including adjusting an amount of diverter material in the slurry based on the changes in fracture planes in the subterranean formation.

Element 15: further including a slurry pump coupled to the wellbore to pump the slurry through the wellbore and into the subterranean formation. Element 16: wherein a section of the wellbore having the entry points is horizontally oriented. Element 17: wherein the coiled tubing member further includes a distributed temperature sensing (DTS) fiber optic cable for collecting DTS data along the length of the coiled tubing member, wherein the DTS fiber optic cable is coupled to the processing component. Element 18: further including a display coupled to the processing component to display an injectivity profile indicative of the change in fracture planes.

Although the present disclosure and its advantages have been described in detail, it should be understood that various changes, substitutions and alterations can be made herein without departing from the spirit and scope of the disclosure as defined by the following claims.

What is claimed is:

1. A method, comprising:
   positioning coiled tubing in a wellbore proximate a plurality of entry points formed between the wellbore and a subterranean formation;
   pumping a slurry comprising diverter material into an annulus of the wellbore surrounding the coiled tubing;
   collecting distributed acoustic sensing (DAS) data along a fiber optic cable disposed in the coiled tubing while pumping the slurry;
   analyzing the DAS data to evaluate changes in fracture planes in the subterranean formation due to interaction of the diverter material with the plurality of entry points; and
   wherein analyzing the DAS data comprises determining a velocity of fluid moving through the annulus based on the DAS data and determining a quantity and direction of fluid moving through the annulus based on the velocity.

2. The method of claim 1, further comprising removing residual particulates from the wellbore proximate the plurality of entry points via the coiled tubing.

3. The method of claim 1, further comprising raising the coiled tubing to a location above the plurality of entry points prior to pumping a treatment fluid into the wellbore.

4. The method of claim 3, further comprising lowering the coiled tubing from the location above the plurality of entry points to a position proximate the plurality of entry points to collect DAS data multiple times during breaks in pumping the treatment fluid.

5. The method of claim 3, further comprising pumping the treatment fluid into the wellbore when the coiled tubing is disposed at least partially in the wellbore.

6. The method of claim 3, further comprising pumping the treatment fluid into the wellbore when the coiled tubing is entirely removed to a surface of the wellbore.

7. The method of claim 1, further comprising shutting in the wellbore and performing a baseline DAS data survey of the wellbore proximate the plurality of entry points via the fiber optic cable prior to pumping the slurry.

8. The method of claim 1, further comprising blocking one or more entry points of the plurality of entry points via the diverter material in the slurry, and redirecting fluids from the wellbore into different entry points.

9. The method of claim 1, further comprising collecting the DAS data along a length of the wellbore spanning all of the plurality of entry points.

10. The method of claim 1, further comprising pumping a tracer fluid with the slurry and collecting the DAS data to detect a flow of the tracer fluid.

11. The method of claim 1, further comprising displaying an injectivity profile indicative of the changes in fracture planes in the subterranean formation.

12. The method of claim 1, further comprising adjusting an amount of diverter material in the slurry based on the changes in fracture planes in the subterranean formation.

13. A system, comprising:
   a coiled tubing member comprising a distributed acoustic sensing (DAS) fiber optic cable for collecting DAS data along a length of the coiled tubing member;
   a processing component communicatively coupled to the DAS fiber optic cable; and
   a memory component containing a set of instructions that, when executed by the processing component, cause the processing component to:
      receive DAS data collected by the DAS fiber optic cable when the coiled tubing member is disposed in a wellbore and a slurry containing diverter material is being pumped through the wellbore and into a subterranean formation via entry points;
      analyze the DAS data to evaluate changes in fracture planes in the subterranean formation due to interaction of the diverter material with the plurality of entry points; and
      determine a change in fracture planes in the subterranean formation based on the collected DAS data, wherein analyzing the DAS data comprises determining a velocity of fluid moving through the annulus based on the DAS data and determining a quantity and direction of fluid moving through the annulus based on the velocity.

14. The system of claim 13, further comprising a slurry pump coupled to the wellbore to pump the slurry through the wellbore and into the subterranean formation.

15. The system of claim 13, wherein a section of the wellbore having the entry points is horizontally oriented.

16. The system of claim 13, wherein the coiled tubing member further comprises a distributed temperature sensing (DTS) fiber optic cable for collecting DTS data along the length of the coiled tubing member, wherein the DTS fiber optic cable is coupled to the processing component.

17. The system of claim 13, further comprising a display coupled to the processing component to display an injectivity profile indicative of the change in fracture planes.

18. A method, comprising:
positioning coiled tubing in a wellbore proximate a plurality of entry points formed between the wellbore and a subterranean formation;
pumping a slurry comprising diverter material into an annulus of the wellbore surrounding the coiled tubing;
collecting distributed acoustic sensing (DAS) data along a first fiber optic cable disposed in the coiled tubing while pumping the slurry;
analyzing the DAS data to evaluate changes in fracture planes in the subterranean formation due to interaction of the diverter material with the plurality of entry points;
collecting distributed temperature sensing (DTS) data along a second fiber optic cable disposed in the coiled tubing while pumping the slurry;
analyzing the DTS data with the DAS data to evaluate changes in fracture planes in the subterranean formation; and
pumping a thermal tracer into the wellbore with the slurry and collecting the DTS data to detect a flow of the thermal tracer.

19. The method of claim 18, further comprising one or more of:
raising the coiled tubing to a location above the plurality of entry points prior to pumping a treatment fluid into the wellbore; and
lowering the coiled tubing from a location above the plurality of entry points to a position proximate the plurality of entry points to collect DAS data multiple times during breaks in pumping the treatment fluid.

20. The method of claim 19, further comprising one or more of:
shutting in the wellbore and performing a baseline DAS data survey of the wellbore proximate the plurality of entry points via the first fiber optic cable prior to pumping the slurry;
blocking one or more entry points of the plurality of entry points via the diverter material in the slurry, and redirecting fluids from the wellbore into different entry points;
collecting the DAS data along a length of the wellbore spanning all of the plurality of entry points;
pumping a tracer fluid with the slurry and collecting the DAS data to detect a flow of the tracer fluid;
displaying an injectivity profile indicative of the changes in fracture planes in the subterranean formation; and
adjusting an amount of diverter material in the slurry based on the changes in fracture planes in the subterranean formation.

* * * * *